US010363711B2

(12) United States Patent
Miller et al.

(10) Patent No.: US 10,363,711 B2
(45) Date of Patent: Jul. 30, 2019

(54) METHOD OF MAKING CONTACT LENSES

(71) Applicants: CooperVision International Holding Company, LP, St. Michael (BB); Contact Lens Precision Laboratories Limited, Bedfordshire (GB)

(72) Inventors: Gary Colin Miller, Southampton (GB); John Haldyn Clamp, Cambridge (GB); David John Clark, Hampshire (GB); Phillip James Maine, Hampshire (GB); Jonathan Andrew Lindley Blaine, Southampton (GB)

(73) Assignees: CooperVision International Holding Company, LP, St. Michael (BB); Contact Lens Precision Laboratories Limited, Bedfordshire (GB)

( * ) Notice: Subject to any disclaimer, the term of this patent is extended or adjusted under 35 U.S.C. 154(b) by 310 days.

(21) Appl. No.: 15/113,052

(22) PCT Filed: Jan. 29, 2015

(86) PCT No.: PCT/GB2015/050207
§ 371 (c)(1),
(2) Date: Jul. 21, 2016

(87) PCT Pub. No.: WO2015/114339
PCT Pub. Date: Aug. 6, 2015

(65) Prior Publication Data
US 2017/0008240 A1 Jan. 12, 2017

(30) Foreign Application Priority Data

Jan. 30, 2014 (GB) .................................. 1401619.0

(51) Int. Cl.
B29D 11/00 (2006.01)
G02C 7/04 (2006.01)

(52) U.S. Cl.
CPC .. *B29D 11/00057* (2013.01); *B29D 11/00125* (2013.01); *B29D 11/00961* (2013.01);
(Continued)

(58) Field of Classification Search
CPC ........ B29D 11/00057; B29D 11/00961; B29D 11/00038; B29D 11/00134;
(Continued)

(56) References Cited

U.S. PATENT DOCUMENTS 4,239,712 A    12/1980   Neefe
4,898,695 A *   2/1990   Doshi .............. B29D 11/00903
                                                                               264/2.6
(Continued)

FOREIGN PATENT DOCUMENTS

CN      102202875 A    9/2011
CN      102221717 A    10/2011
(Continued)

OTHER PUBLICATIONS

International Search Report and Written Opinion issued in corresponding International Patent Application No. PCT/GB2015/050207 dated Mar. 31, 2015 (11 pages).
(Continued)

*Primary Examiner* — Anthony Calandra
*Assistant Examiner* — Caroline Montiel
(74) *Attorney, Agent, or Firm* — Kilyk & Bowersox, P.L.L.C.

(57) ABSTRACT

The invention relates to a method of making a contact lens, the method comprising identifying the eccentricity of a lens produced in a mold half, lathing the lens and adjusting the path of the lathe to take account of the eccentricity, and a computer program for controlling the lathe.

8 Claims, 7 Drawing Sheets

(52) U.S. Cl.
CPC .. *B29D 11/00038* (2013.01); *B29D 11/00134* (2013.01); *G02C 7/04* (2013.01)

(58) Field of Classification Search
CPC ......... B29D 11/0048; B29D 11/00413; G02B 1/04; G02B 1/043; B29L 2011/0041; G02C 7/04; G02C 7/046; G02C 7/047; G02C 7/049
See application file for complete search history.

(56) References Cited

U.S. PATENT DOCUMENTS

| | | | |
|---|---|---|---|
| 5,260,000 A | 11/1993 | Nandu et al. | |
| 5,517,260 A * | 5/1996 | Glady | G02C 7/028 351/159.42 |
| 5,861,114 A * | 1/1999 | Roffman | B29C 33/306 264/1.1 |
| 2003/0214646 A1* | 11/2003 | Ito | G01M 11/0221 356/124 |
| 2004/0246440 A1* | 12/2004 | Andino | A61B 3/0025 351/159.74 |
| 2005/0260343 A1 | 11/2005 | Han | |
| 2007/0037898 A1* | 2/2007 | Phelan | G02B 1/043 351/159.33 |
| 2008/0277811 A1 | 11/2008 | Miller et al. | |
| 2013/0297015 A1* | 11/2013 | Johns | G01M 11/0278 356/239.2 |

FOREIGN PATENT DOCUMENTS

| | | |
|---|---|---|
| GB | 2082957 A1 | 3/1982 |
| JP | S63179728 A | 7/1988 |

OTHER PUBLICATIONS

Written Opinion of the International Preliminary Examining Authority (Second Written Opinion) issued in corresponding International Patent Application No. PCT/GB2015/050207 dated Jan. 18, 2016 (6 pages).
International Preliminary Report on Patentability issued in corresponding International Patent Application No. PCT/GB2015/050207 dated May 4, 2016 (with Response to WO filed Mar. 11, 2016 and Article 34 claims) (13 pages).
Office Action received in corresponding Chinese Patent Application No. 201580006681.5 dated Mar. 29, 2018 (in Chinese with English translation attached) (8 pages).

* cited by examiner

METHOD OF MAKING CONTACT LENSES

This application is a National Stage Application of PCT/GB2015/050207, filed Jan. 29, 2015, which claims priority to United Kingdom Patent Application No. 1401619.0, filed Jan. 30, 2014, which are incorporated in their entirety by reference herein.

The present invention relates to a method of making contact lenses, and in particular a method of making hydrogel contact lenses involving a combination of moulding and machining the lenses.

Hydrogel contact lenses are the most common commercially available contact lenses. A number of different methods of making hydrogel contact lenses are known to the skilled person. The most common method of making hydrogel contact lenses is by cast moulding. This method involves forming a lens between two mould halves, wherein each mould half has an optically acceptable lens-defining surface which corresponds to the required shape of the final lens. This process is particularly suited to producing large quantities of identical lenses. In this method, a mould set of two mould halves is only used once. The mould sets are produced from master moulds.

An alternative method of making hydrogel contact lenses involves lathing both surfaces of the lens from polymerized contact lens buttons. This method is less common commercially but is particularly useful for less common lens prescriptions such as toric contact lenses, where large quantities do not need to be produced. US2006/0001184 discloses a method of making silicone hydrogel contact lenses from a polymer rod using lathing.

It is also known to use hybrid processes that involve cast moulding and lathing. U.S. Pat. No. 5,260,000 discloses a method of making silicone hydrogel lenses which involves forming a lens in a mould and machining the resultant lens. Specific machining operations include lathe cutting the edge, buffing the edge or polishing the lens edge or surface.

EP2181836 discloses an alternative method of producing small batches of hydrogel contact lenses which involves lathing a mould half rather than a contact lens or contact lens button. Generic mould halves are produced from master moulds, and at least one optically acceptable surface of the mould halves is lathed to introduce a lens feature. A lens is then produced using the lathed mould half. No subsequent lathing of the lens is required.

In some circumstances, such as for less common lens prescriptions, the standard cast moulding process is not appropriate as it is expensive to produce mould inserts for each master mould as well as time consuming to change the mould inserts for very small batches. A suitable method of overcoming this problem is to mould a lens and lathe the resulting lens to introduce the required lens feature as described in U.S. Pat. No. 5,260,000.

The lens can typically be lathed either before being released from the mould part or after. However, for the purposes of the present invention, at least some of the lathing should take place with the lens in the mould part. The lathing machine can then hold the mould part, which provides the orientation of the lens. However, when a lens is produced using a mould set, it is not typically formed in the exact centre of the mould. Rather it is offset somewhat. This offset is known as the eccentricity. Although this eccentricity is not large (typically less than 100 μm), an eccentricity greater than 30 μm is sufficient to mean that standard lathing techniques cannot be used as the offset results in misshapen and/or truncated lathed regions which would not be correctly positioned relative to the pupil when in use.

One method to overcome this problem is to use more complicated expensive moulding machines which limit the eccentricity in the produced lenses to less than 30 μm. However, it would be advantageous to provide a method which allowed a lens to be produced by moulding and lathing which allowed the use of standard moulding equipment and conventional lathing tools.

In addition, it has also been identified that the moulding process can result in other problems with the resultant lens, which results in a lens being out of specification after lathing. It would be advantageous to identify the extent to which these problems may have occurred and to take account of it, thereby permitting a lens to be produced within specification by moulding and lathing using standard moulding equipment and conventional lathing tools.

Accordingly, in a first aspect of the present invention, there is provided a method of making a contact lens, the method comprising:
  (i) providing a first master mould for producing a first mould half and a second master mould for producing a second mould half
  (ii) producing at least one precursor mould comprising the first mould half and the second mould half, wherein the first mould half is for providing a first lens surface having at least one optical feature and the second mould half is for providing a second lens surface which requires lathing to provide at least one added optical feature;
  (iii) producing a moulded precursor contact lens in each of the at least one moulds, wherein the step of producing the lens results in at least one identifiable undesirable attribute;
  (iv) identifying the at least one undesirable attribute on the precursor contact lens;
  (v) determining the extent of the at least one undesirable attribute;
  (vi) providing at least one lens producing mould formed from the master moulds, each lens producing mould having a first mould half and a second mould half, wherein the first mould half is for providing a first lens surface having at least one optical feature and the second mould half is for providing a second lens surface which requires lathing to provide at least one added optical feature;
  (vii) producing the contact lens in at least one lens producing mould;
  (viii) removing the second mould half, whereby the contact lens remains positioned on the first mould half; and
  (ix) lathing the second lens surface using a lathe tool, wherein the path of the lathe tool is controlled by a computer programme, and wherein the computer programme adjusts the path to compensate for the undesirable attribute of the test contact lens identified in step (iv).

In a second aspect of the present invention, there is provided a method of making a contact lens, the method comprising:
  (i) providing a first master mould for producing a first mould half and a second master mould for producing a second mould half
  (ii) producing at least one precursor mould comprising the first mould half and the second mould half, wherein the first mould half is for providing a first lens surface having at least one optical feature and the second mould half is for providing a second lens surface which requires lathing to provide at least one added optical feature;

(iii) producing a moulded precursor contact lens in each of the at least one moulds;

(iv) removing the second mould half, whereby the at least one precursor contact lens remains positioned on the first mould half;

(v) identifying the eccentricity of the at least one precursor contact lens from the centre of the first mould half;

(vi) providing at least one lens producing mould formed from the master moulds, each lens producing mould having a first mould half and a second mould half, wherein the first mould half is for providing a first lens surface having at least one optical feature and the second mould half is for providing a second lens surface which requires lathing to provide at least one added optical feature;

(vii) producing the contact lens in at least one lens producing mould;

(viii) removing the second mould half, whereby the contact lens remains positioned on the first mould half; and (ix) lathing the second lens surface using a lathe tool, wherein the path of the lathe tool is controlled by a computer programme, and wherein the computer programme adjusts the path to compensate for the eccentricity of the test contact lens identified in step (iv).

In the present invention, reference is made to a step of "lathing". In accordance with the present invention, the term "lathing" is intended to cover any operation undertaken on the contact lens using a lathe, including machining, cutting and polishing.

The applicant has identified that for a single pair of master moulds, the resultant mould halves will produce lenses which have a constant eccentricity. By identifying the extent of the eccentricity, it is possible to change the lathe path to compensate for this difference. By taking the eccentricity into account, the lens is correctly lathed so that the added optical features are positioned correctly relative to the centre of the lens. This method therefore allows the reliable production of partially lathed lenses without the requirement of expensive machinery required to ensure that the eccentricity is less than 30 µm or possibly even less.

It is known that lenses produced using a particular pair of master moulds show some variability in, for example, size and shape. However, the applicant has identified that for a single pair of master moulds, the resultant mould halves can produce lenses in which certain properties differ from the idealised lens. For example, the resultant lens may have a larger optic zone diameter or centre thickness than would be expected. The applicant has identified that some of these features need to be taken into account when the rear surface of a mould is to be lathed. As well as the aforementioned eccentricity, the following features have been identified as being features which may need to be taken into account.

In some cases, toricity can be introduced onto either the front or rear surface of the lens. There are a number of mechanisms by which this can occur as part of the process of producing a cured lens. Toricity can be induced in the lens as a result of the step of injection moulding. This is particularly the case where the polymerisable mixture is injected into the cavity through a single point (known as the gate). In addition, toricity can be induced during the step of closing the mould or as part of the curing process. The introduction of toricity is particularly relevant when the rear surface of the lens is to be lathed to introduce toricity. The front or rear surface toricity present in the moulded lens can add to or subtract from the lathed toricity depending on its orientation, therefore resulting in a lens which is outside specification.

Other optical aberrations can also be produced as part of the process of producing a cured lens. Examples include prism correction, spherical aberration, comatic aberration, trefoil aberration and other high order aberrations.

In some cases, other misalignment problems can be present. This misalignment can be characterised in terms of r theta OM i.e. a distance r and angle theta of offset. For example an offset may be a simple displacement of centres whereby the axis of rotation of the two surfaces is parallel, or it may be that the axes have an angular misalignment as well.

A number of optical features can be associated with the front surface of the lens i.e. the side which is not in contact with the eye in use, a number of optical features can be associated with the rear surface of the lens i.e. the side which is in contact with the eye in use, and a number of features can be associated with either surface. The skilled person is aware of which features are which. In accordance with the present invention, it is preferred that all of the features of the first surface are provided by the first mould half and at least some of the features of the second surface are produced by lathing. In one preferred embodiment, all of the features of the second surface are produced by lathing.

Optical features that are associated with the front surface of a lens include a spherical optical zone, an aspherical optical zone, a toric optical zone, a prism ballast, other freeform or dynamic ballast designs, orientation marks or combinations thereof.

Optical features associated with the rear surface of the lens include a sphere power, an add power, a cylinder power, a cylinder axis or combinations thereof.

Optical features which can be associated with either surface include multifocal optical zones to correct for presbyopia, multifocal designs to inhibit progression of myopia, diffractive optics, or corrections for irregular corneas.

It is preferred that the first lens surface is the front surface and the second lens surface is the rear surface.

The method preferably produces a set of lenses. In preferred embodiments, the resultant lenses are toric contact lenses, spherical multifocal lenses, toric multifocal lenses, myopia control lenses, toric myopia control lenses, spherical lenses, or aspheric lenses. In one particularly preferred embodiment, different lenses can be produced by lathing different features into the lenses. In this embodiment, it is possible to produce a range of lenses having different properties from a single pair of master moulds simply by changing the lathing path. Examples include the production of sets of toric lenses having different cylinder powers and or cylinder axes.

In this way, it is possible to use the present invention to produce less common prescription lenses more cheaply and more easily without the need for bespoke equipment. In addition, the present invention is particularly suited to making lenses when ordered rather than stockpiling lenses, which is usual when using standard cast moulding methods.

The master moulds used in the present invention are standard master moulds. They are shaped to produce moulds which typically have one optical surface. The optical surface is formed by a mould insert in the master mould. Different mould inserts can be used to provide different optical surfaces.

The mould insert of a standard master mould is usually formed of metal, such as brass, stainless steel or nickel, although other suitable materials are known to the skilled person. The mould inserts are typically machined to a very accurate level to produce the optical surface. The remainder of the master mould is shaped to form a first or second mould half. It is usual to use two different master moulds to produce the two mould halves which fit together.

Each master mould is typically used to produce a mould half having an optical surface. In the present invention, one surface of the resultant contact lens is to be lathed rather than formed in a mould. Therefore, it is possible to use only one mould half with an optical surface, the other mould half not having an optical surface. However, whilst the lathing typically removes part of one surface of the lens, it is not necessary to remove the entire surface. Therefore, it is preferable that both master moulds provide mould halves having an optical surface.

The mould halves can be produced of any suitable material. As the contact lens monomer mixture cures, it shrinks. The material shrinkage causes a vacuum in the sealed mould cavity which is accommodated by a deformation of one or both of the mould halves. Therefore, at least one of the mould halves must be flexible. Suitable materials include any injection mouldable plastics material with good optical properties, which are compatible with the lens material. Common mould materials include polypropylene. Alternative materials which can be used include thermoset polymers including two-part reactive thermoset materials such as flexible silicones. It is possible to form one or both of the mould halves using a non-flexible material such as quartz. It is preferred however that at least one mould half is sufficiently flexible.

The resultant mould halves fit together and form a mould cavity. In use, the contact lens monomer mixture is normally added into the female mould half and the male mould half is positioned on top to close the mould cavity with the monomer mixture in place. It is possible that the lens monomer mixture can be added onto the male mould half, although this is less usual.

The mould is suitable for making a contact lens according to the second aspect of the present invention. A contact lens is made by introducing a measured amount of a contact lens monomer mixture into the female mould half and closing the mould with the male mould. In one preferred embodiment, the monomer mixture is a silicone-containing mixture for forming a silicone hydrogel contact lens. However, the present invention is also suitable for conventional hydrogel materials which do not contain silicone. Suitable monomer mixtures are well known in the art and include those disclosed in EP2087384 and EP2488895. Once the mould is closed with the monomer mixture in the mould cavity, the mould is preferably sealed closed using one of the various methods known to the skilled person. Suitable methods include sonic welding, thermal welding, the presence of interference features in the mould halves or by use of weights or clamps. In the alternative, the mould does not need to be sealed. Thereafter, the monomer mixture is cured, typically by using heat, UV light, microwave radiation, radiofrequency radiation or any other suitable method known to the skilled person.

After curing, the mould is opened and one mould half removed. In the present invention, it is preferred that the lens remains in the other mould half. The surface of the lens is then lathed to provide the required surface features on the lens. The skilled person will be aware of any suitable lathing techniques. It is preferred that the lathing is undertaken using a single-point diamond lathe, using controlled radius diamond tools. Suitable lathe manufacturers include DAC International and Sterling International. Suitable manufactures of the controlled radius diamond tools include those manufactured by Apex Diamond Products, Chase Diamond Tools, Contour Fine Tooling, K and Y Diamond and Technodiamant. The lathe path is controlled electronically by a computer programme to provide a very accurate lathe path. Such computer programmes are provided by the lathe manufacturers, such as DAC International and Sterling International and are known to the skilled person. After lathing, the contact lens is removed from the mould half. The produced contact lens is then hydrated, packed and sterilised in the usual manner.

As has been identified by the applicant, a series of mould halves produced using a particular pair of master moulds fit together in a consistent manner. As discussed above, it is possible to produce complicated mould halves which have a design which ensures that the mould halves fit together in precisely the correct position such that the produced lens is exactly centred. However, the applicant has identified that it is possible to use a standard mould set, to identify the each undesirable attribute and to correct for it or them in a cost-efficient manner.

Once it has been identified that the undesirable attributes of the resultant lenses are consistent for a set of mould halves, it is possible to use this information to allow the lenses to be lathed in a consistent manner which allows the claim features to be correctly positioned.

The first step is to identify the one or more undesirable attributes. This is preferably undertaken by identifying the attribute from a list of known undesirable attributes. Preferably the list covers the eccentricity of the lens from the centre of the mould half; the residual toricity on the front or rear surface of the lens; prism correction; spherical aberration; comatic aberration; or trefoil aberration.

Once the undesirable attributes have been identified, the extent of the undesirable attribute is determined. Depending on the specific attribute, the method of identifying it will vary. The skilled person is able to identify suitable methods.

By way of example, where the undesirable attribute is the eccentricity of the lens in the mould half, the next step is to identify the size of the eccentricity of the lens in the mould half after opening of the mould. A number of possible methods would be apparent to the skilled person. One suitable method would be to inspect the lens optically, for example by using a microscope. An alternative method would be to lathe the produced lens in the required manner and identify the relative offset of the lathed feature or features. Suitable methods of identifying the offset of the lathed feature include optical methods such as a microscope. Given the very small eccentricities that are present, it is easier to observe the offset of the lathed feature on the lens rather than simply identify the eccentricity of a lens on a mould half.

Each master mould generally produces a certain degree of offset. There is a further offset which is associated with each mould insert. As a result, it is possible to estimate in advance the approximate eccentricity of a lens in mould from the master moulds and mould inserts used. However, estimation alone will not necessarily provide the correct offset.

In one preferred embodiment, the eccentricity can be identified using an iterative process, where the lathing step is undertaken using a first offset, which can be the estimated offset, and moved in a series of steps, on a series of different lenses, until the correct eccentricity is identified. Subsequent lenses can then be lathed using this eccentricity.

The eccentricity can be measured in any manner that is suitable. One example could be using Cartesian coordinates from the central point of the mould half. However, it is preferred that the eccentricity is measured using a polar coordinate system by defining an angle and magnitude of offset from the central point.

The skilled person is able to put together a series of iterations that could be used. One suitable method could be to identify the offset angle using an initial offset magnitude, by varying the angle in 60° steps to find the approximate offset angle, and then 5° steps to find an accurate offset angle. The offset magnitude can then be varied in 5 or 10 µm steps to identify the offset magnitude.

Where the process has introduced residual toricity into the produced lens, there are a number of methods that can be used to measure it. Measurement can either take place on an uncut lens or following an additional step of lathing a spherical surface on one surface, so that only the toricity of the other surface remains. The resulting lens, whether uncut or lathed on one surface, is removed from the mould and its toric power measured by conventional methods, such as a focimeter (or lensmeter). Other suitable machines to achieve the same effect are known to the skilled person. Examples of suitable metrology include the "NIMO" models from Lambda-X, "SHS Ophthalmic" and "Omnispect" models from Optocraft, the "Contest Plus" models from Rotlex, and the "Lens Profiler" from PhaseFocus. The extent and angle of the toricity can therefore be measured.

The optical aberrations such as prism correction, spherical aberration, comatic aberration and trefoil aberration can be measured by wavefront analysis using commercially available machines such as the "NIMO" models from Lambda-X, "SHS Ophthalmic" models from Optocraft and the "Contest Plus" models from Rotlex.

Misalignment of the re kind can be measured in a number of ways, including by use of a stylus, interferometry, or atomic force microscopy.

Once the extent of the undesirable attribute or attributes have been measured, the values can be introduced into the computer programme, and the lathing steps will then take place utilising this information. A standard, commercially available programme does not provide for dealing with this eccentricity. However, it is straightforward to the skilled person to introduce into the programme this functionality. The lathing steps will then produce the lathed features such that the resultant lens is within specification. Where the attribute is the eccentricity, the lathing steps take place using the centre of the produced lens as the centre point rather than the centre of the lens mould.

The resulting lenses will therefore have the lathed features in the correct position.

Accordingly, in a third aspect of the present invention, there is provided a computer programme for controlling a lathe for lathing an optical feature onto a surface of a contact lens, wherein the contact lens is positioned on a mould half, wherein the computer programme comprises:
  a) an input for inputting the extent of at least one undesirable attribute of a lens; and
  b) an output for controlling the lathe to produce the optical feature on the surface of the lens, wherein the output is modified by the input, such that the optical feature is correctly produced on the contact lens.

In a fourth aspect of the present invention, there is provided a computer programme for controlling a lathe for lathing an optical feature onto a surface of a contact lens, wherein the contact lens is positioned on a mould half, wherein the computer programme comprises:
  a) an input for inputting an offset for the lens relative to the centre of the mould half; and
  b) an output for controlling the lathe to produce the optical feature on the surface of the lens, wherein the output is modified by the input, such that the optical feature is correctly positioned relative to the centre of the contact lens. It is preferred that the input provides the offset using a polar coordinate system by defining an angle and magnitude of offset from the central point.

All features described in connection with any aspect of the invention can be used with any other aspect of the invention.

The invention will now be further described with reference to the following drawings in which:
  FIG. 1 shows two mould halves containing lenses.
  FIG. 2 shows the effect of different angles of offset for a given magnitude of offset
  FIG. 3 shows the effect of using different angles of offset for a given magnitude of offset over a narrower angle range
  FIG. 4 shows the effect of using different magnitudes of offset for a constant angle.
  FIG. 5 shows the variance in sphere power caused by residual toricity
  FIG. 6 shows the variance in cylinder power caused by residual toricity
  FIG. 7 shows the variance in axis caused by residual toricity
  FIG. 8 shows how lathe cutting can accommodate residual toricity to produce the desired lens.

In FIG. 1, there is shown a first female mould 1 and a second female mould half 10. In each mould half 1, 10 is a contact lens 15, 20 respectively. As can be seen, the lens is offset from the centre of the female mould half. The offset is significantly exaggerated to demonstrate the problem identified and solved by the present invention.

For the first mould half, a toric feature 25 has been lathed into the lens 15, using the centre of the mould half 1 as the centre point of the lens. The toric feature 25 can be seen to be offset from the centre of the lens. In practice, the offset here would be sufficient to make the lens unwearable.

The second female mould half 10 shows a lens where the lathing has been adjusted to take account of the eccentricity produced by the moulding process. Here is can be seen that the toric feature 30 is centred on the lens 20 rather than the mould half 10. As a result, the lens is wearable.

In each of these figures, it can be seen that a change of angle or magnitude has an impact on the positioning of the lathed toric section. The need to identify the correct eccentricity is therefore clear. One identified, it is possible to produce a series of contact lenses in which the toric section is correctly positioned.

Figure 1:
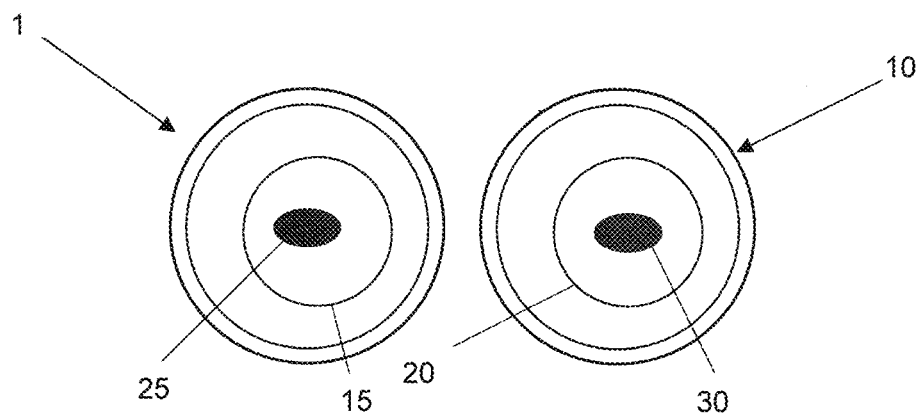
Figure 2:
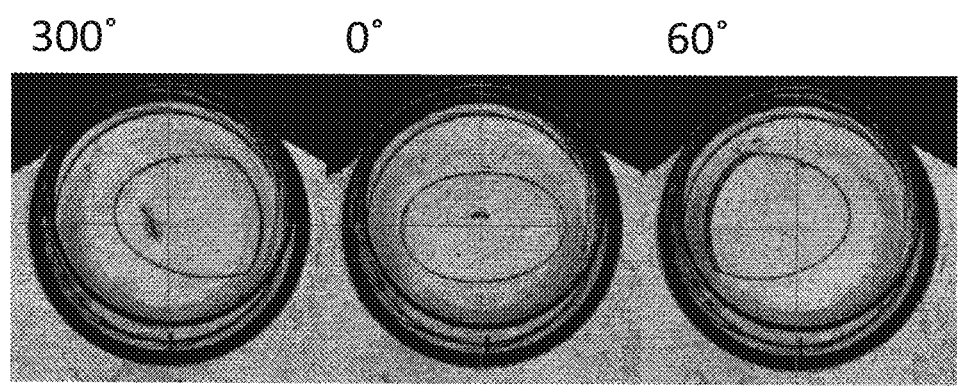
FIG. 2 shows the effect of varying the offset angle from 300° to 60° in 60° increments for an offset magnitude of 0.065 microns for a lathed toric section.
Figure 3:
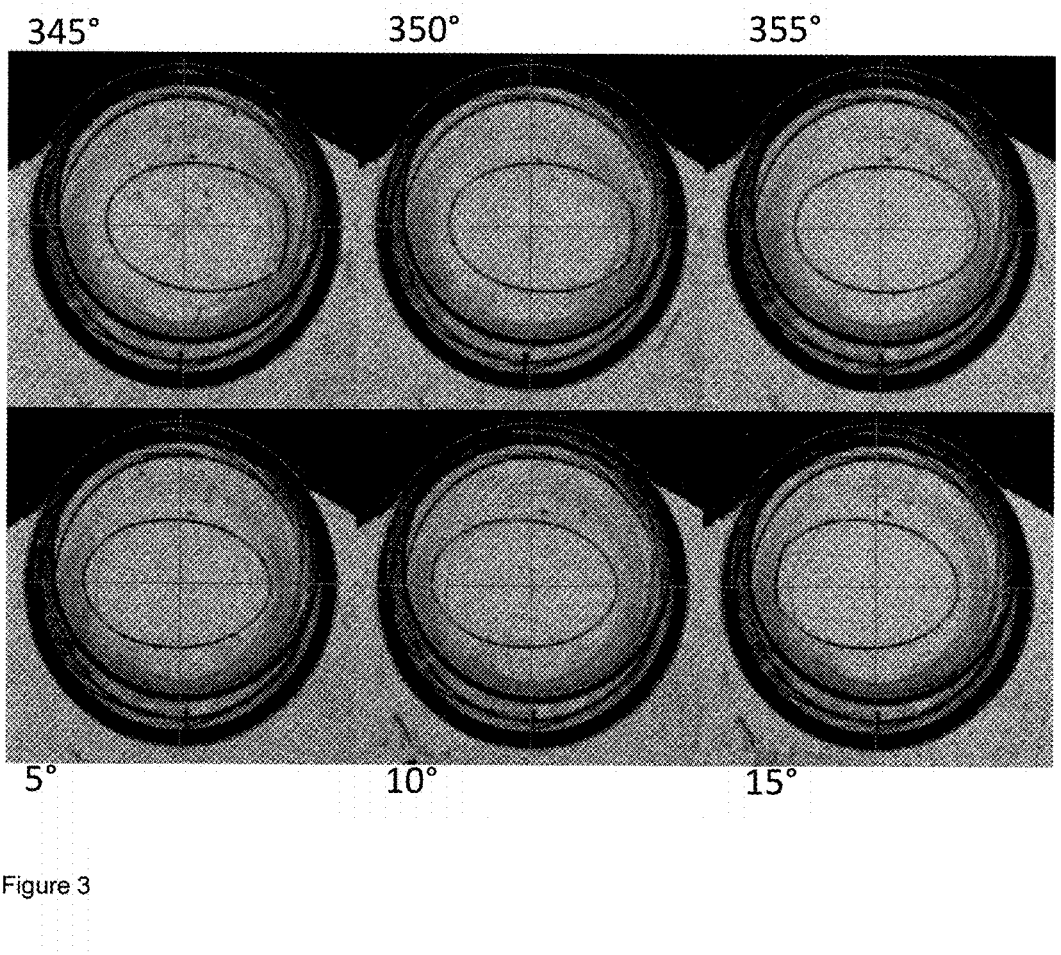
FIG. 3 shows the effect of varying the offset angle from 345° to 15° in 5° increments for an offset magnitude of 0.065 microns for a lathed toric section.
Figure 4:
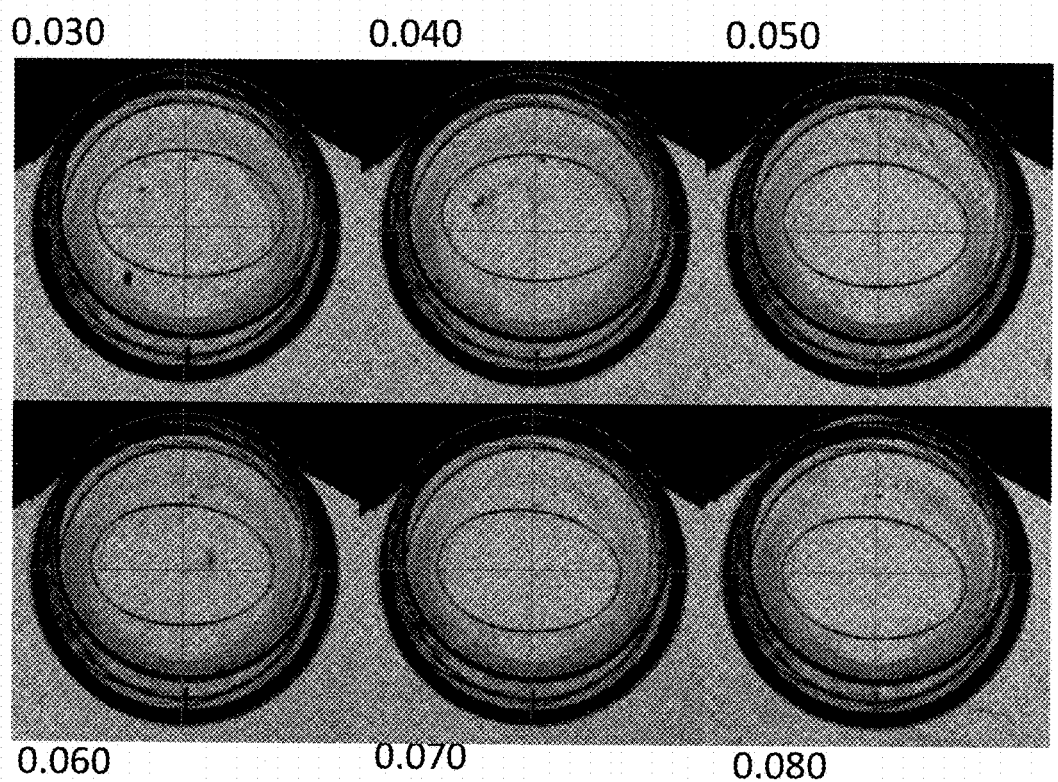
FIG. 4 shows the effect of varying the offset magnitude from 0.03 to 0.08 microns in 0.01 micron increments for a lathed toric section.
Figure 5:
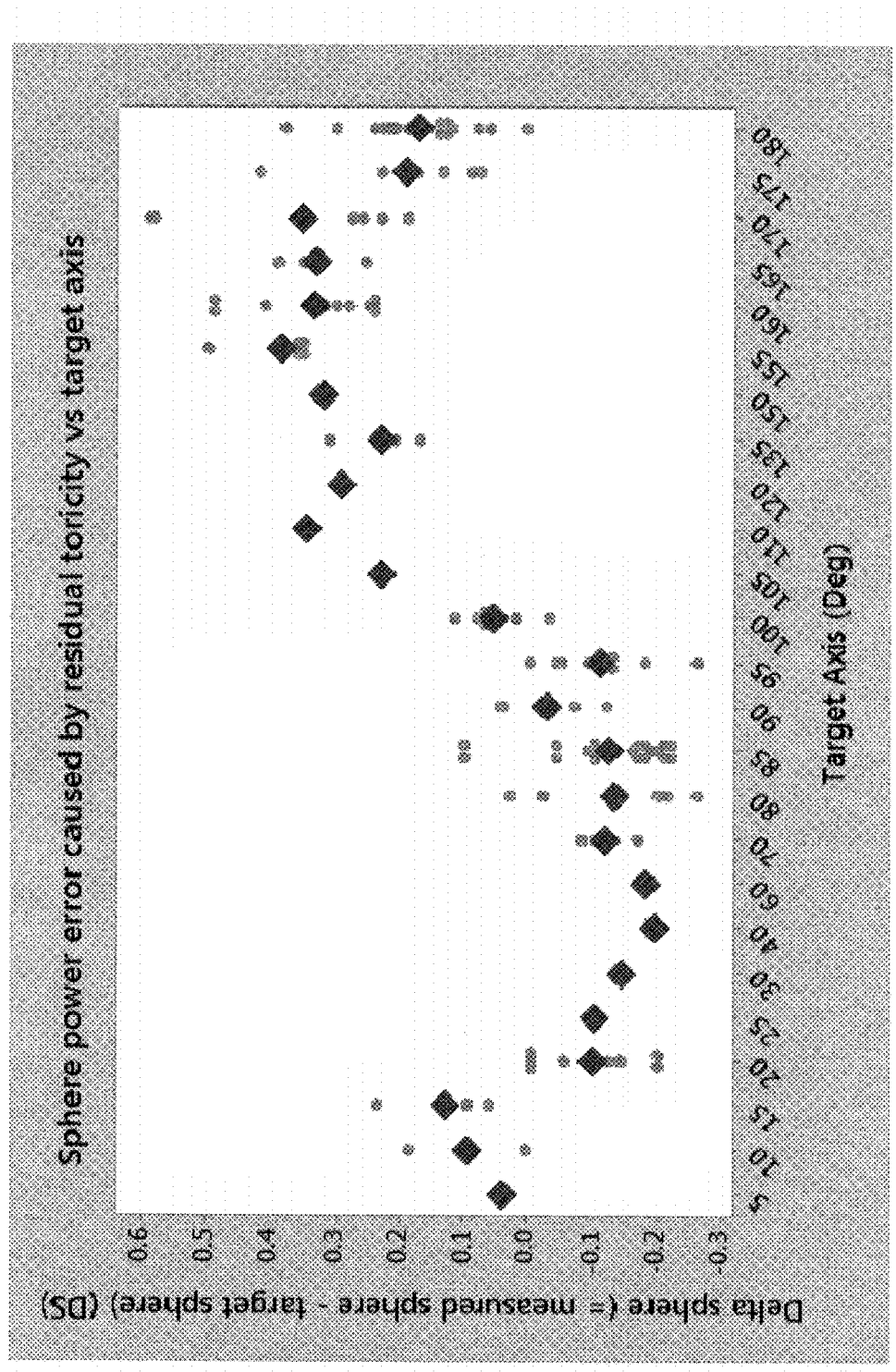
Figure 6:
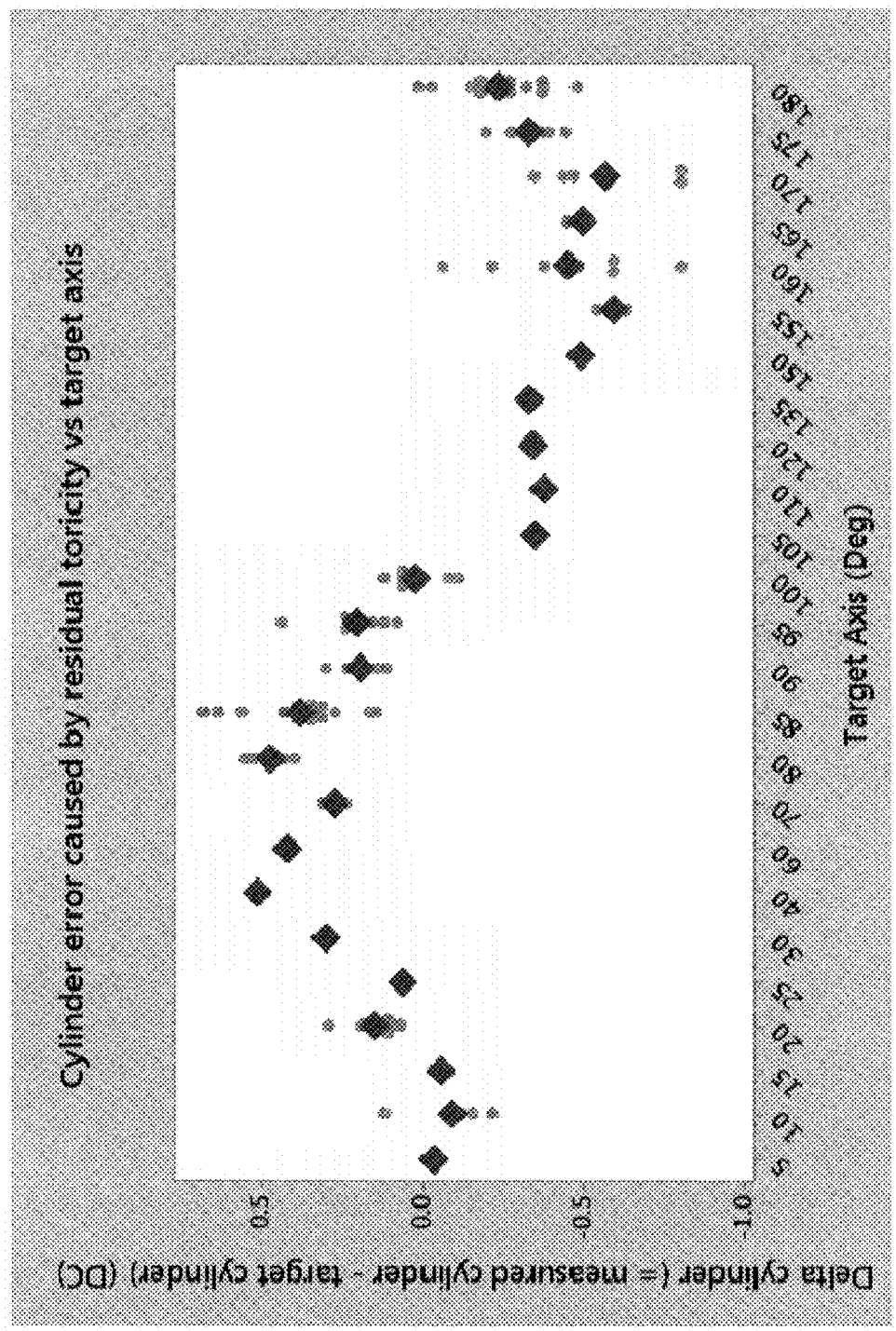
Figure 7:
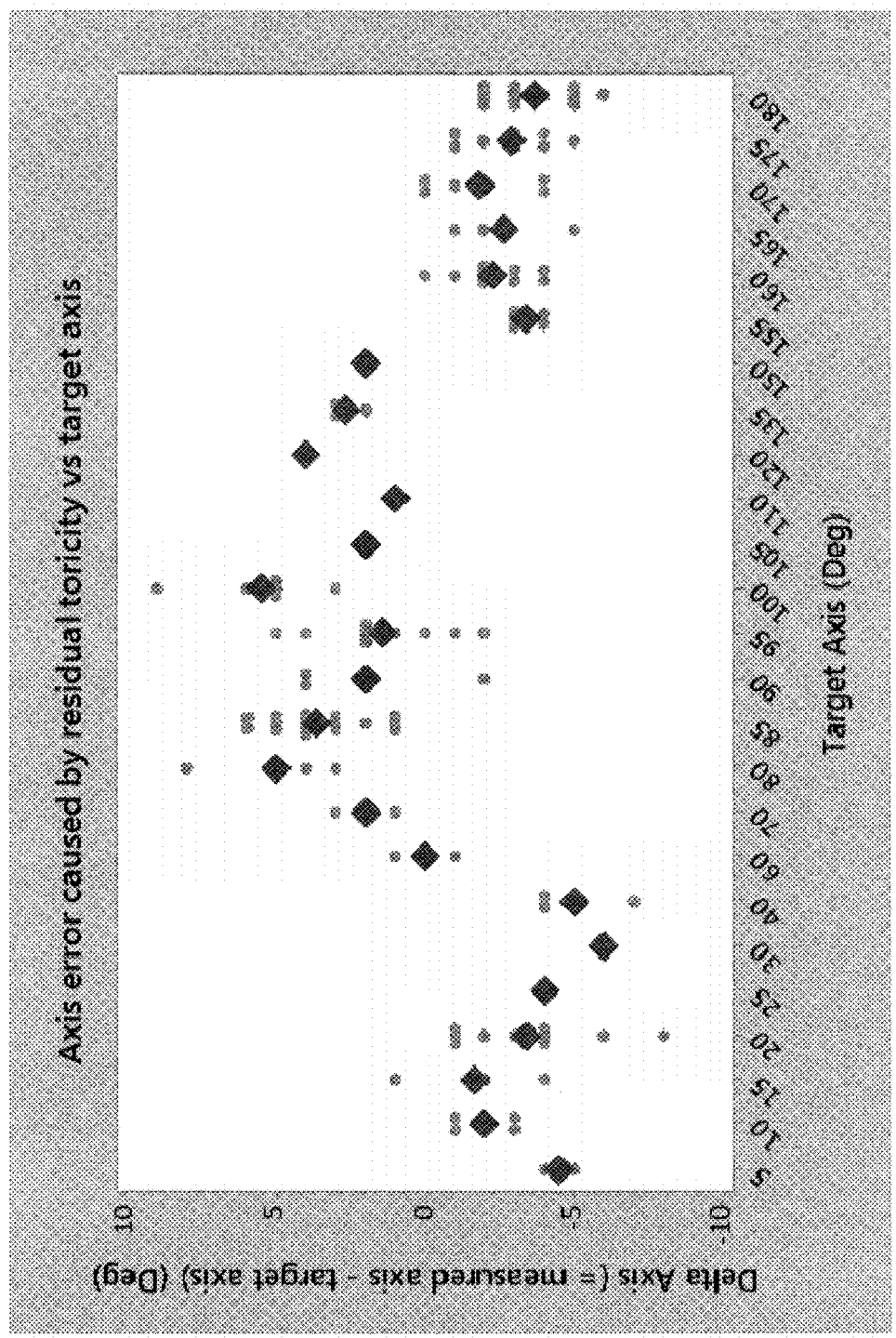

In FIGS. 5 to 7, an example is given of how residual toricity produced in a series of lenses, can affect the sphere power, cylinder power and toric axis lathed into a contact lens. In this case the residual toricity introduced into a series of lenses as approximately −0.40 cylinder power at an axis of 140°. The charges show actual values as small dots and average values as large diamonds.

In each case, the chart shows the difference between the target value and the actual value measured for a series of different lenses after a toric cylinder was lathed into the rear of the lens surface at a series of different axes.

For contact lenses to meet ISO standards, the sphere power and cylinder power should be accurate to within +/−0.25 D of the target value for many of the lower powers, which make up the majority of the astigmatic population—specifically sphere powers of less than or equal to a magnitude of 10 DS, and cylinder powers of less than or equal to 2 DC. The toric axis should be accurate to within +/−5°.

It can be seen from FIGS. 5 and 6 that the spherical and cylinder powers fall outside the required tolerance range. Similarly, albeit to a lesser extent, there is a variation of for the toric axis which falls outside the permitted tolerance range. It is to be further noted that the errors are at their maximum at different target axes. Therefore, it is likely that at least one parameter will fall outside the tolerance range.

Figure 8:
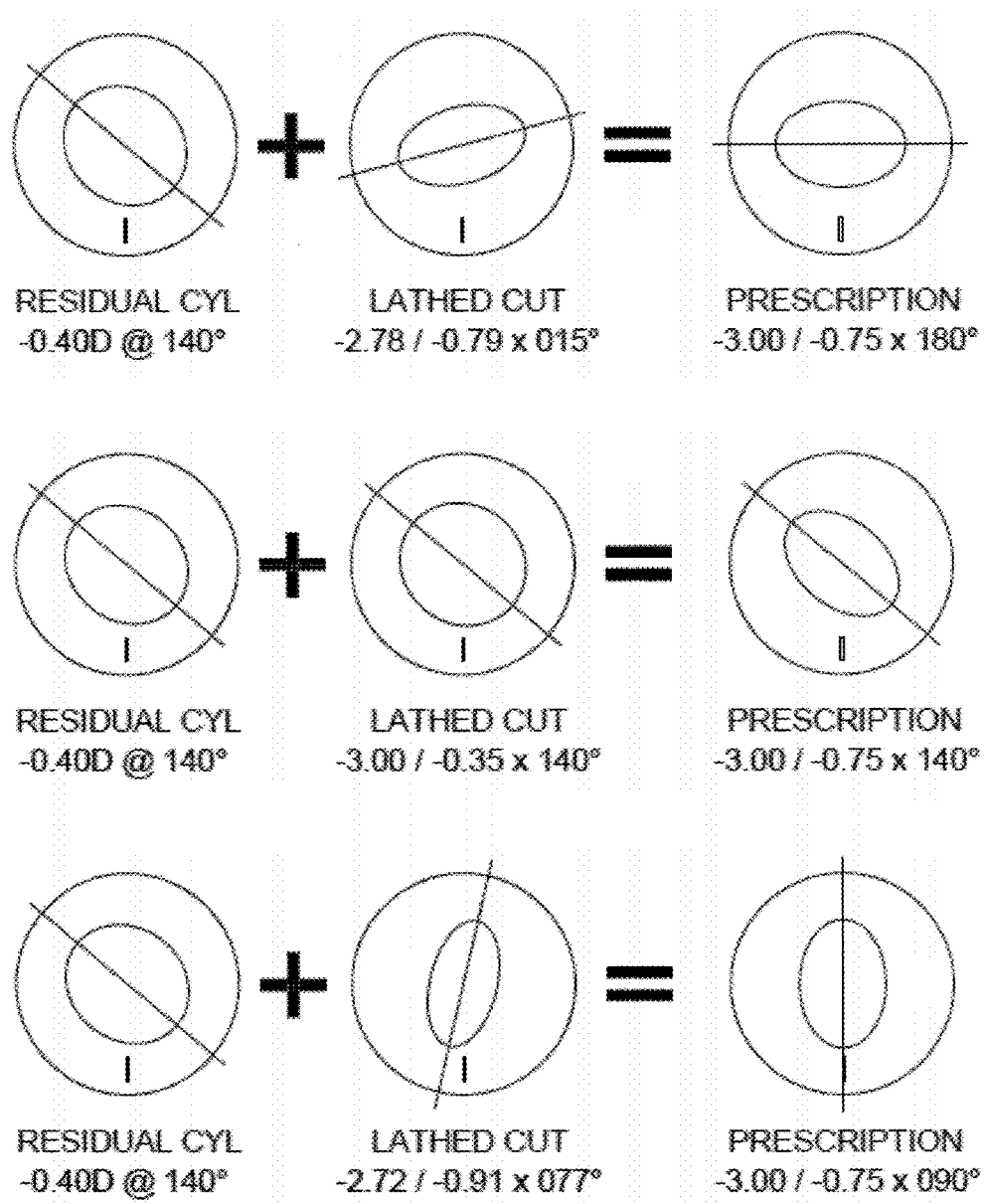

FIG. 8 shows how it is possible to combine the residual toricity and a selected lathed value to arrive at the required prescription range. Using the residual toricity described above, the skilled person can select a specific angle, sphere power and cylinder power to arrive at the desired prescription powers and angle. In each case, the resultant lens has the required properties, having taken account of the residual toricity.

Whilst the invention has been described with reference to a preferred embodiment, it will be appreciated that various modifications are possible within the scope of the invention.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

The invention claimed is:

1. A method of making a contact lens, the method comprising:
(i) providing a first master mould for producing a first mould half and a second master mould for producing a second mould half;
(ii) producing at least one precursor mould comprising the first mould half and the second mould half, wherein the first mould half is for providing a first lens surface having at least one optical feature and the second mould half is for providing a second lens surface which requires lathing to provide at least one added optical feature;
(iii) producing a moulded precursor contact lens in each of the at least one precursor mould, wherein the step of producing the lens results in at least one identifiable undesirable attribute;
(iv) identifying the at least one undesirable attribute on the moulded precursor contact lens;
(v) determining the extent of the at least one undesirable attribute;
(vi) providing at least one lens producing mould formed from the first master mould and second master mould, each lens producing mould having a first mould half and a second mould half, wherein the first mould half is for providing a first lens surface having at least one optical feature and the second mould half is for providing a second lens surface which requires lathing to provide at least one added optical feature;
(vii) producing the contact lens in at least one lens producing mould;
(viii) removing the second mould half, whereby the contact lens remains positioned on the first mould half; and
(ix) lathing the second lens surface using a lathe tool, wherein the path of the lathe tool is controlled by a computer programme, and wherein the computer programme adjusts the path to compensate for the undesirable attribute of the moulded precursor contact lens identified in step (iv),
wherein the at least one undesirable attribute comprises an eccentricity of the precursor test contact lens from the centre of the of the mould half, and the eccentricity is characterized by defining an angle and magnitude of offset.

2. The method of claim 1, wherein at least one of the undesirable attributes is caused by the positioning of the lens on the first mould half.

3. The method of claim 1, wherein after step (iii), the second mould half is removed, whereby the at least one precursor contact lens remains positioned on the first mould half for identification of the undesirable attribute.

4. The method of claim 1, wherein after step (iii), the precursor contact lens is removed from the mould halves and the undesirable attribute is identified on the lens.

5. The method of claim 1, wherein the at least one undesirable attribute further comprises at least one of:
the residual toricity on the front or rear surface of the lens;
prism correction;
spherical aberration;
comatic aberration; and
trefoil aberration.

6. The method of claim 1, wherein the first lens surface is the front surface and the second lens surface is the rear surface.

7. The method of claim 1, wherein the at least one optical feature is selected from a spherical optical zone, an aspherical optical zone, a toric optical zone, a prism ballast or combinations thereof.

8. The method of claim 1, wherein the steps of (iii) producing the moulded precursor contact lens and (vii) producing the contact lens comprise the steps of adding a contact lens monomer mixture to one of the first or second mould halves, closing the mould using the other of the first or second mould halves and curing the mixture in the mould.

* * * * *